(12) United States Patent
Kaliszczyk et al.

(10) Patent No.: US 12,686,498 B2
(45) Date of Patent: Jul. 21, 2026

(54) ROTATABLE MOUNTING SYSTEM

(71) Applicant: B/E Aerospace, Inc., Winston-Salem, NC (US)

(72) Inventors: Piotr Krzysztof Kaliszczyk, Wrocław (PL); Sinan Akdeniz, Munich (DE)

(73) Assignee: B/E Aerospace Inc., Winston-Salem, NC (US)

( * ) Notice: Subject to any disclaimer, the term of this patent is extended or adjusted under 35 U.S.C. 154(b) by 0 days.

(21) Appl. No.: 19/061,572

(22) Filed: Feb. 24, 2025

(65) Prior Publication Data

US 2025/0382056 A1 Dec. 18, 2025

(30) Foreign Application Priority Data

Feb. 23, 2024 (EP) ..................................... 24461533

(51) Int. Cl.
*B64D 11/06* (2006.01)
*F16C 11/04* (2006.01)

(52) U.S. Cl.
CPC ...... *B64D 11/0696* (2013.01); *B64D 11/0639* (2014.12); *F16C 11/04* (2013.01)

(58) Field of Classification Search
CPC .................................................. B64D 11/0696
See application file for complete search history.

(56) References Cited

U.S. PATENT DOCUMENTS

| | | | | |
|---|---|---|---|---|
| 3,652,050 A | * | 3/1972 | Marrujo | B60N 2/01558 |
| | | | | 248/501 |
| 4,213,593 A | * | 7/1980 | Weik | B64D 11/0696 |
| | | | | 248/501 |
| 4,230,432 A | * | 10/1980 | Howell | B60P 7/0815 |
| | | | | 410/105 |
| 5,058,829 A | | 10/1991 | Bentley | |
| 5,975,822 A | | 11/1999 | Ruff | |
| 6,149,118 A | | 11/2000 | Ruff | |
| 6,601,798 B2 | * | 8/2003 | Cawley | B60N 2/0224 |
| | | | | 244/118.6 |
| 8,292,224 B1 | * | 10/2012 | Ahad | B64D 11/0696 |
| | | | | 244/118.6 |
| 10,464,445 B2 | * | 11/2019 | Trimble | B64D 11/0696 |
| 10,583,926 B2 | * | 3/2020 | Erhel | B60N 2/14 |

(Continued)

FOREIGN PATENT DOCUMENTS

| | | |
|---|---|---|
| DE | 102012218761 A1 | 3/2014 |
| EP | 1108608 B1 | 7/2006 |

(Continued)

OTHER PUBLICATIONS

European Patent Office, Extended European Search Report received in EP Application No. 24461533.2, Jul. 29, 2024, 8 pages.

*Primary Examiner* — Marisa V Conlon
(74) *Attorney, Agent, or Firm* — Sulter Swantz IP

(57) ABSTRACT

A mounting system for mounting an object to a surface in two or more orientations relative to the surface includes a first portion configured to be attached to the object, in use, and a second portion configured to be attached to the surface, in use. The first portion and the second portion may be rotatable relative to each other. The mounting system further includes a locking mechanism configured to lock the first portion relative to the second portion when the first portion is at a predetermined rotational position relative to the second portion.

14 Claims, 9 Drawing Sheets

(56) References Cited

U.S. PATENT DOCUMENTS

| | | | | |
|---|---|---|---|---|
| 10,759,538 B2 * | 9/2020 | Danet | ................ | B64D 11/0696 |
| 10,953,990 B2 * | 3/2021 | Danet | ................ | B64D 11/0696 |
| 11,338,922 B2 * | 5/2022 | Oleson | .............. | B64D 11/0696 |
| 11,407,332 B1 * | 8/2022 | Aktas | ................... | B60N 2/0224 |
| 11,571,995 B2 | 2/2023 | Last | | |
| 11,904,736 B2 * | 2/2024 | Aktas | ........................ | B60N 2/14 |
| 12,503,238 B2 * | 12/2025 | Patzlsperger | ...... | B64D 11/0696 |
| 2025/0051015 A1 * | 2/2025 | Wieland | ............ | B64D 11/0696 |
| 2025/0229904 A1 * | 7/2025 | Akdeniz | ............ | B60N 2/01558 |
| 2025/0256851 A1 * | 8/2025 | Kaliszczyk | ........ | B60N 2/01575 |
| 2025/0269964 A1 * | 8/2025 | Kolodziejczak | ......... | B60N 2/32 |
| 2025/0368335 A1 * | 12/2025 | Chodyniecki | .......... | B60N 2/753 |

FOREIGN PATENT DOCUMENTS

| | | | |
|---|---|---|---|
| EP | 2295318 B1 | 7/2012 | |
| GB | 1432109 A | 4/1976 | |
| GB | 2436819 A | 10/2007 | |
| WO | 2014205329 A1 | 12/2014 | |

* cited by examiner

ROTATABLE MOUNTING SYSTEM

CROSS-REFERENCE TO RELATED APPLICATIONS

The present disclosure claims the benefit of European Patent Application No. EP 24461533.2, filed Feb. 23, 2024, which is herein incorporated by reference in the entirety.

TECHNICAL FIELD

The present disclosure is directed towards fittings for mounting items to a floor or other platform, such as, but not limited to, mounting a seat in a vehicle or aircraft.

BACKGROUND

There is, in many applications, a need to removably mount and secure an item to a platform or floor in a particular orientation. In some situations, it may be desired to mount the object in different orientations according to circumstances. One example, is seating used in vehicles or aircraft, including helicopters. Seats are typically mounted to the floor or platform of the vehicle/aircraft using a fitting attached to a lower part of the seat which slides into and is secured in tracks provided on the floor/platform. The fittings and tracks may be configured to allow sliding movement of the seat along the track to an appropriate position and locking systems may be provided to releasably secure the seat at the required position along the track. Such tracks are usually arranged to align with/extend longitudinally to or be orthogonal to/extend laterally to the direction of motion—i.e., the driving or flight direction. In some cases, multiple configurations are provided so that the direction of the seats can be changed as required. Typically, to change the orientation of a seat, a different fitting needs to be selected according to the orientation and tools are required to undo and attach the appropriate fittings. This can be complex and time intensive and requires special parts, fittings, and tools to change the seat orientation. Seats are just one example of objects that may need to be mounted to a platform in different orientations. There is a desire for an improved mounting system that simplifies mounting an object to a platform (which, hereinafter, includes a floor) in a desired orientation.

SUMMARY

Accordingly, there is provided a mounting system for mounting an object to a surface in two or more orientations relative to the surface. In embodiments, the mounting system includes a first portion configured to be attached to the object, in use, and a second portion configured to be attached to the surface, in use, where the first portion and the second portion are rotatable relative to each other. In embodiments, the mounting system further includes a locking mechanism configured to lock the first portion relative to the second portion when the first portion is at a predetermined rotational position relative to the second portion.

Also provided is a vehicle seat system, such as an aircraft seat system incorporating such a mounting system.

BRIEF DESCRIPTION

Examples of the mounting system according to this disclosure will now be described with reference to the drawings. It should be noted that these are examples only and variations are possible within the scope of the claims. In particular (but not only) the examples are described with reference to mounting a vehicle/aircraft seat to a floor or platform, but it is feasible that the mounting system of this disclosure could also be used for mounting other objects to a floor or platform or similar surface.

DETAILED DESCRIPTION

As mentioned above, there is often a need for an object to be mounted to a surface or platform in different orientations. An example is an aircraft seat mounted to the floor/platform of the aircraft. It is sometimes desired to mount the seat to be facing in or against the direction of flight (i.e., longitudinally) and at other times across the aircraft, i.e., longitudinally. To mount such seats, typically, rails or tracks are provided on the floor or platform and a fitting is provided to be attached to the seat, on one side, and to locate in the track on the other side. If a seat is set to be mounted longitudinally, the fitting will be of a given orientation to fit into the track. To mount the seat in another orientation, e.g., laterally, a different fitting will be needed to be received in the track in a different orientation. The fittings, therefore, need to be switched out using tools, which is time and labour intensive.

The mounting system according to the present disclosure allows a single rotatable fitting to be used that can be easily moved from one orientation to another. For example, the rotatable fitting may be moved by rotating of the fitting attached to the seat 140 (or other object to be mounted)

relative to the part of the fitting located in the track. In this way, the mounting orientation of the seat relative to the track can be easily varied by rotation of part of the fitting relative to the other part of the fitting. The seat 140 may include, but is not limited to, a seatback 142, a seat pan 144, and a base assembly 146 (or leg assembly).

Figure 1:
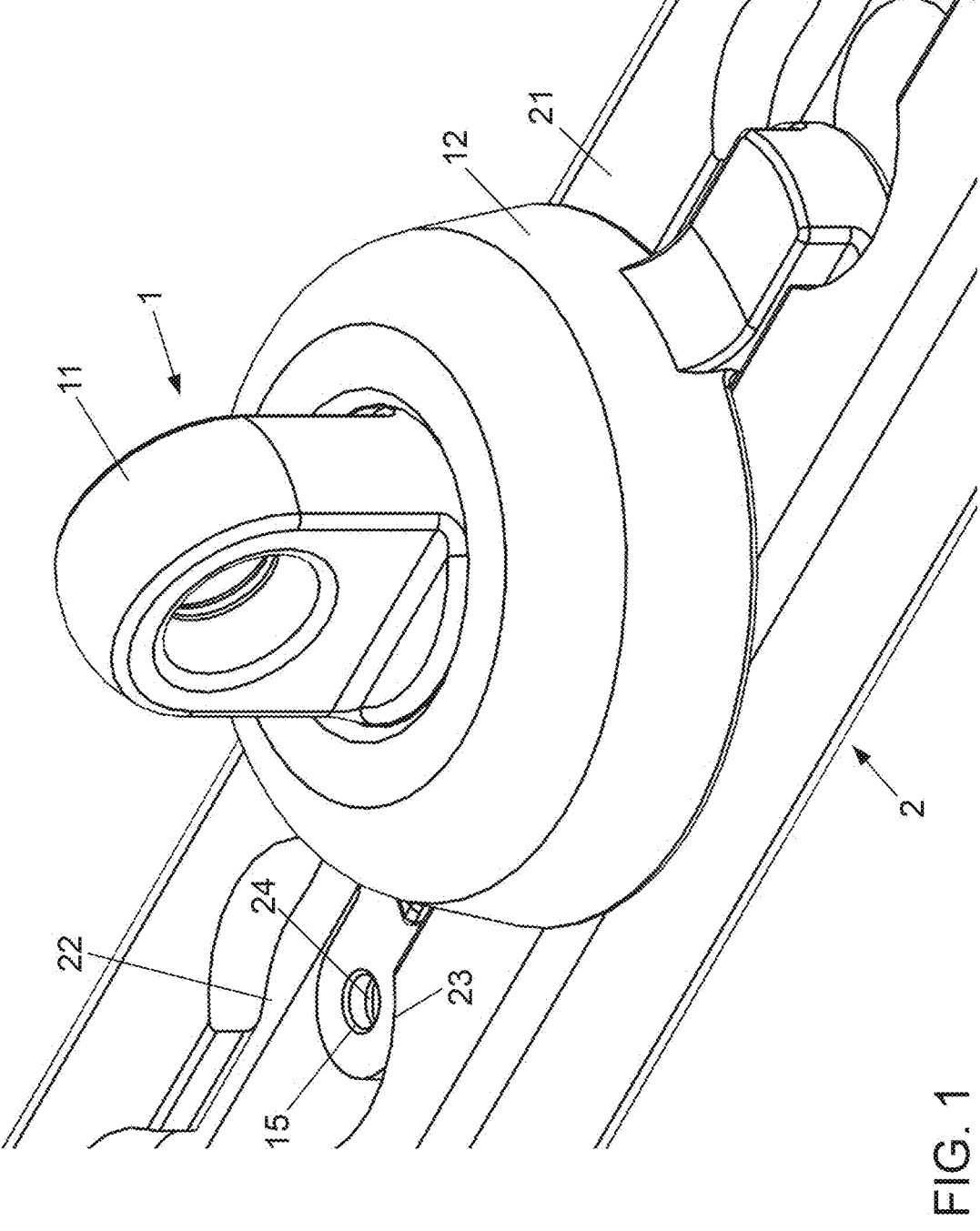
FIG. 1 shows a rotatable mounting system mounted in a track, in accordance with one or more embodiments of the present disclosure.

An example of the mounting system 1 of the present disclosure, as mounted in a track 2, is shown in FIG. 1. The track 2 is a linear track arranged and secured in one orientation on a floor or platform, the track having a track body 21 and a track groove 22 running along the track body and configured to receive the mounting system 1.

Figure 2:
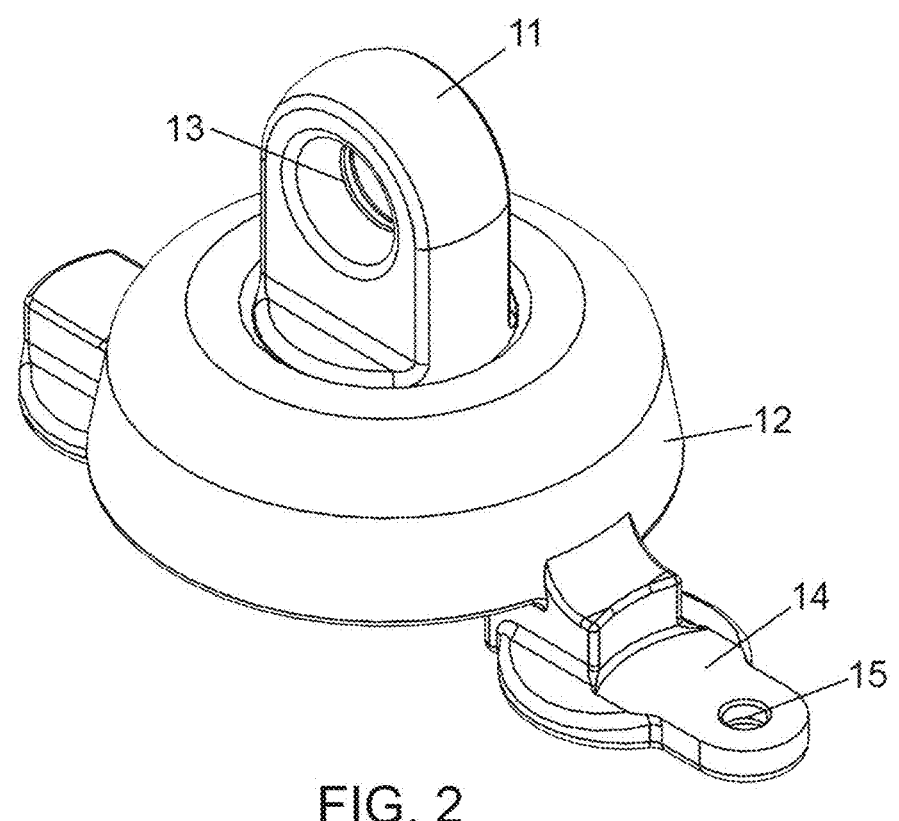
FIG. 2 is an isometric view of the rotatable mounting system, in accordance with one or more embodiments of the present disclosure.

The mounting system 1, shown in FIGS. 1 and 2, includes a first portion 11 configured to be fixed to the seat or other object to be mounted and a second portion 12 arranged to receive the first portion 11, where the first portion 11 and the second portion 12 are rotatable relative to each other, from a first orientation relative to the track (in use, when the system is mounted in the track) to a second orientation.

In the example shown, the first portion 11 is in the form of a flange or bracket or other fitting shaped or configured to be connected to the seat. In the example shown, the first portion is provided with a hole 13 therethrough. This can be connected to the seat, e.g., by a bolt or other fastener.

The second portion 12 is in the form of a housing for the first portion 11. In this example, the second portion 12 is a substantially cylindrical or cup-type housing and the first portion 11 is accommodated therein and extends therefrom. The second portion 12 is configured to be mounted, in use, to the track 2. It may be configured to be secured in a selected position along the track 2. The second portion 12 may be arranged such that it can be slid or guided along the track groove 22 until a selected position is reached on the track 2 and then secured in place. In other examples, it is possible that the second portion 12 is only able to be secured at a single location on the track 2.

In the example shown, the second portion 12 has an integrated rail 14 (or track rail 14) that, in use, locates in the track groove 22. The track rail 14 may be provided with means for securing the second portion 12 (and, hence, the mounting system 1) relative to the track 2. For example, the rail 14 may have a hole 15 therein by means of which it can be secured to the track 2 by a bolt, pin, screw, or other fastener.

The groove 22 in the track 2 may be a simple linear groove along which the mounting system 1 can slide. The groove 22 may, however, be provided with discrete locking portions where the mounting system 1 can be secured to the track 2. For example, the track 2 may have discrete wider portions 23 along the groove 22 where holes 24 are provided in the track 2 such that when the holes 15 of the rail 14 of the mounting system 1 align with the holes 24 in the track 2, the mounting system 1 can be secured relative to the track 2 by a screw, pin, etc. through both holes 15, 24.

Figure 3:
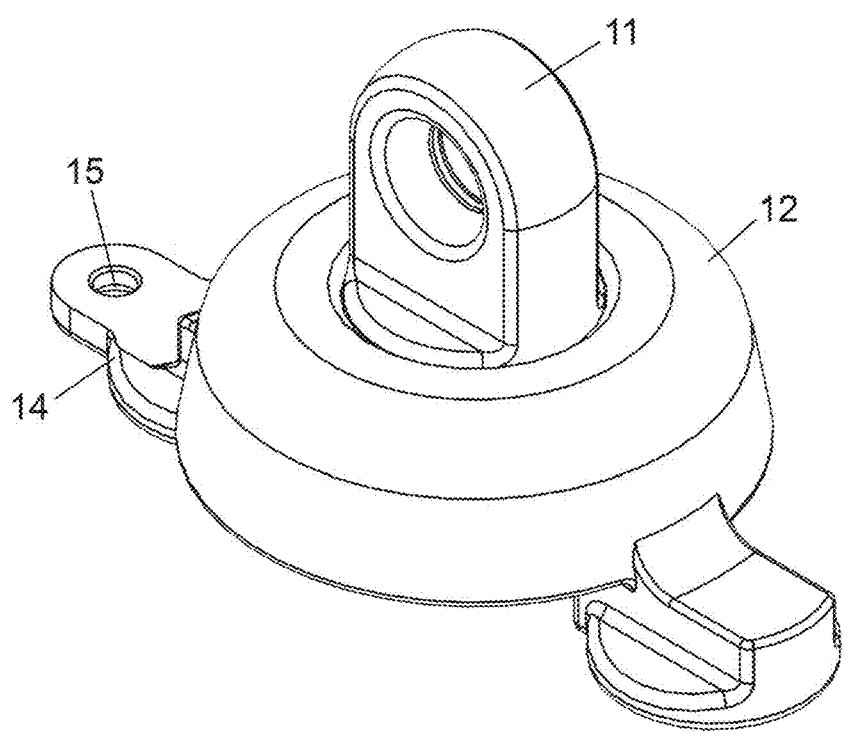
FIG. 3 shows the system of FIG. 2 in a first orientation, in accordance with one or more embodiments of the present disclosure.
Figure 4:
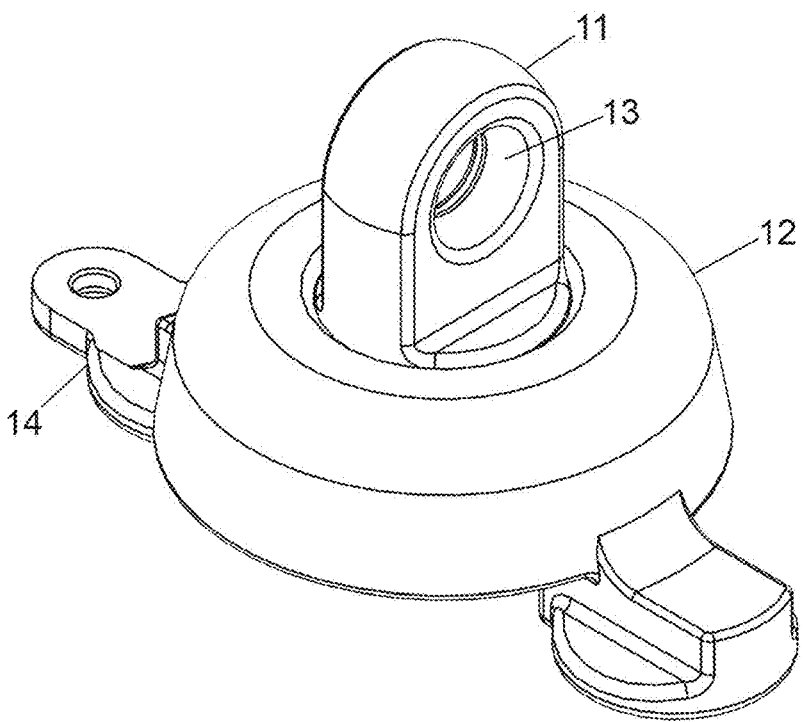
FIG. 4 shows the system of FIG. 2 in a second orientation, in accordance with one or more embodiments of the present disclosure.
Figure 5:
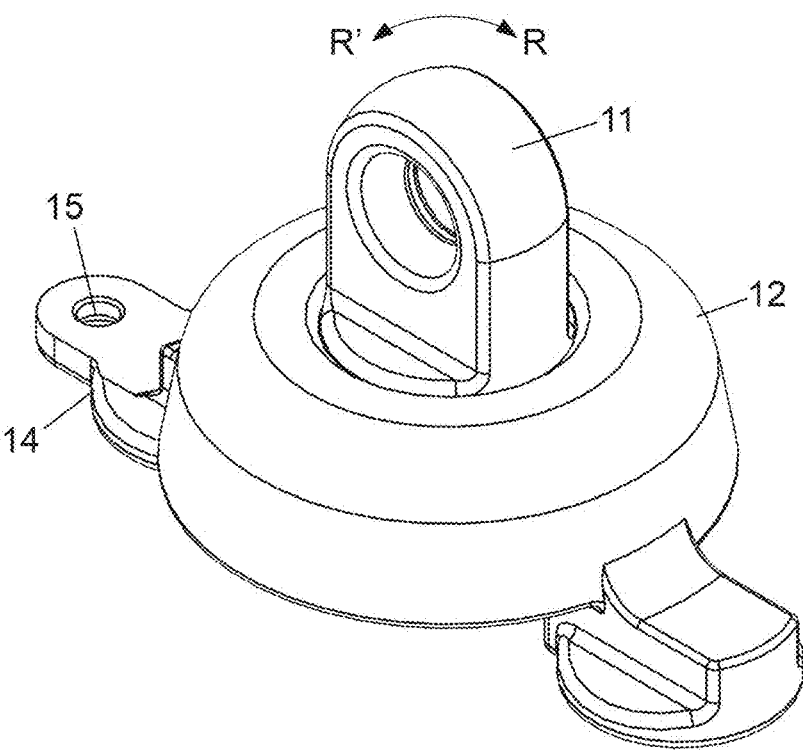
FIG. 5 illustrates an operation of the system, in accordance with one or more embodiments of the present disclosure.

The rotatable mounting system—i.e., with the first portion 11 and the second portion 12 being rotatable relative to each other, means that a seat can be quickly and easily mounted in two different floor configurations, namely along or perpendicular (or some other selected angle) to the direction along which the track 2 extends. In one example, the first portion 11 has two distinct positions or orientations relative to the second portion which are essentially at 90 degrees to each other as shown in FIGS. 3 and 4. In FIG. 3, the first portion 11 is shown orientated in a first (here lateral) direction relative to the second portion 12 and, in FIG. 4, the first portion 11 is rotated to a second (longitudinal) direction. When the seat is attached to the first portion 11 and the second portion 11 is fitted to the track 2, therefore, the seat will have a corresponding orientation.

The mounting system 1 may be configured to provide a haptic and/or audible feedback to indicate that the first portion 11 has reached the selected rotational position, e.g., with a 'click' and can be configured, as described below, to lock in the desired orientation. The locking mechanism (described further below) can be manually released when the orientation of the locking system is to be changed.

For installation, in one example, the first portion 11 may be permanently attached to the seat to be mounted to the track 2 and the second portion 12 may be rotated to the desired relative orientation so that it can be fitted to and secured to the track 2. In another example, it could be envisaged that the second portion 12 is mounted to the track 2 and then the first portion 11 is rotated to the desired orientation after which the seat is attached to the first portion 11. This latter method may be trickier to perform in a limited or constrained space.

The rotational and locking mechanism of the mounting system 1 will now be described with reference to FIGS. 5 to 9. FIG. 9 is shown inverted with respect to the other figures to better show how the component parts locate in the second (housing) portion 12.

Referring first to FIG. 9, the mounting system 1 may include, as mentioned above, the first portion 11 and the second portion 12. The first portion 11 is, again, shown as a flange with the attachment hole 13 for attachment to the seat, although other configurations and means of attachment are also possible. The second portion 12 is, again, shown as a housing having an opening 120 therethrough through which the first portion 11 extends. The first portion 11 also has a base 110 which seats against a lip 121 around the opening 120 of the housing 12. A cover plate 20 may be provided across the back of the housing 12 and may be secured in place e.g. by screws 200 to retain the first portion parts within the housing 12 (or second portion 12) provided by the first portion 11 and to keep the mounting system 1 as a single unit.

The first portion 11 is also provided with a locking mechanism 30 in the form of a ball 31 mounted in an opening 32 extending through the base 110 of the first portion 11, the ball 31 being biased radially relative to the opening 32 by a spring 33 and the ball 31 and spring 33 being secured in the opening 32 by a retainer 34, e.g., a plug. In this example, the opening 32 is threaded and the retainer 34 is a threaded plug 34 that threadedly engages with the opening 32 to secure the ball 31 and spring 33. The opening 32 extends radially through the first portion 11 such that in the nominal or default position, the spring 33 is compressed between the ball 31 and the retainer 34 and pushes the ball 31 radially outwards relative to the first portion base 110. The base 110, within which the locking mechanism 30 is assembled, is rotatably mounted within the housing 12 formed by the second portion 12. The ball 31 is prevented from escaping the radially outer contour of the upper portion due to the geometry of the opening 132 in which it is located and the inner profile of the second portion housing 12 pressing against the ball 31 opposing the force of the spring 33. This position is shown as the 'middle position' in FIG. 7. With the ball 31 in this position, the second portion 12 can be rotated (see arrow R in FIG. 7 or in the opposite direction of rotation) relative to the first portion 11 (or vice versa).

The second portion 12 is provided with recesses or detents 220 in its radially inner surface where the first portion 11 is housed. The circumferential location of the recesses 220*a*, 220*b* is selected such that when the ball 31 aligns with (and extends into as described below) one of the recesses 220a, the first portion 11 is in a first selected orientation (e.g., 'lateral position') relative to the second portion 12 and when the ball 31 aligns with the other recess 220b, the first portion 11 is in a second selected orientation (e.g., 'longitudinal position) relative to the second portion 12. The recesses 220a, 220b may be positioned such that the two orientations are perpendicular to each other or other relative angles may be selected. It is also conceivable that more than two recesses are provided to allow more than two orientations.

Figure 8:
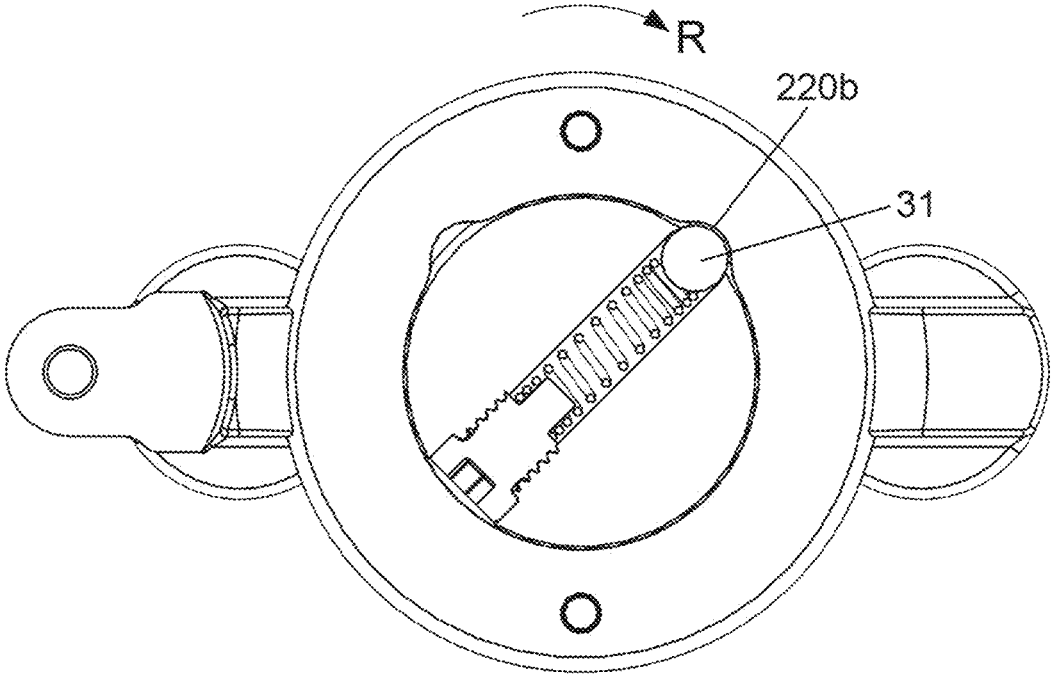
FIG. 8 shows an interior view of the system in a third position, in accordance with one or more embodiments of the present disclosure.
Figure 9:
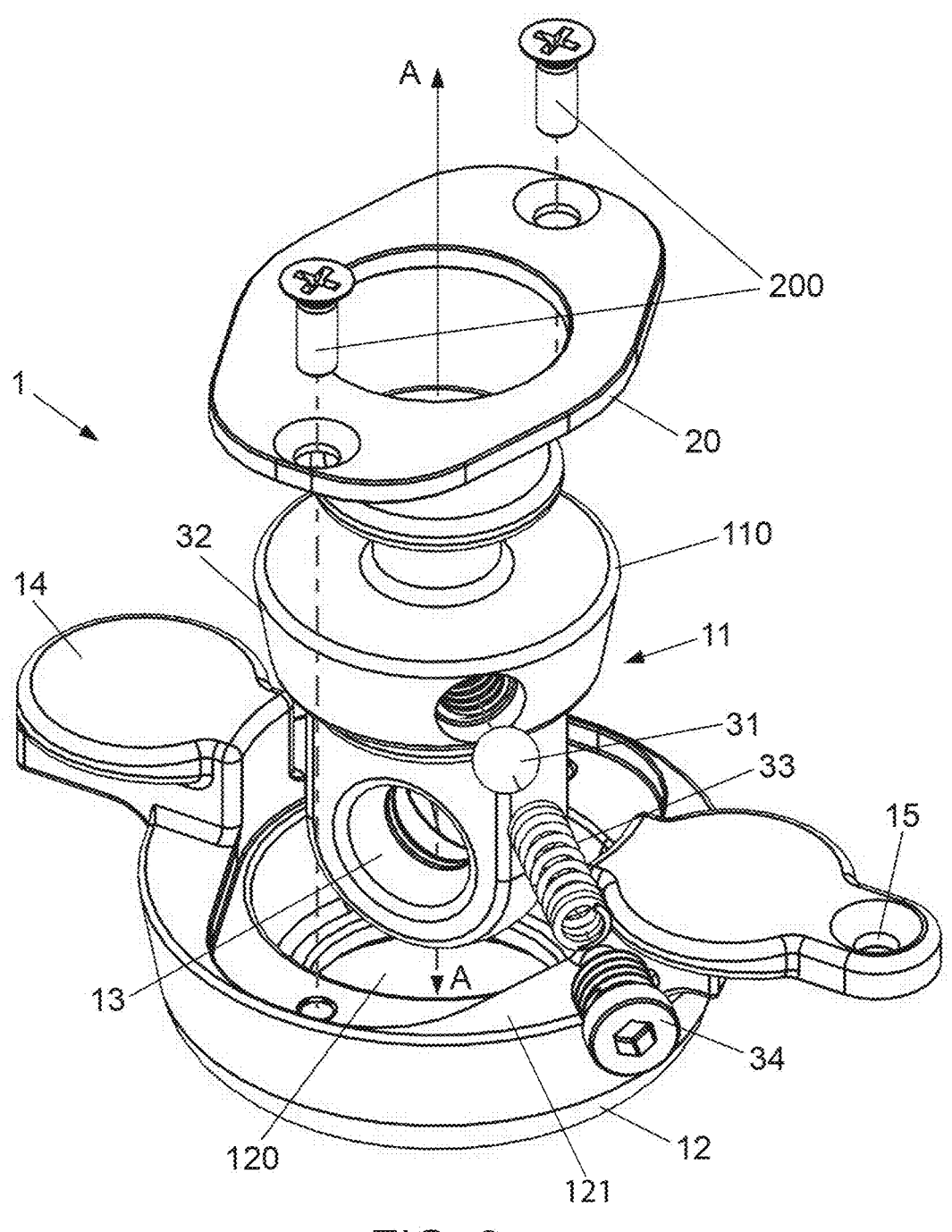
FIG. 9 is an exploded view of the system, in accordance with one or more embodiments of the present disclosure.
Figure 10:
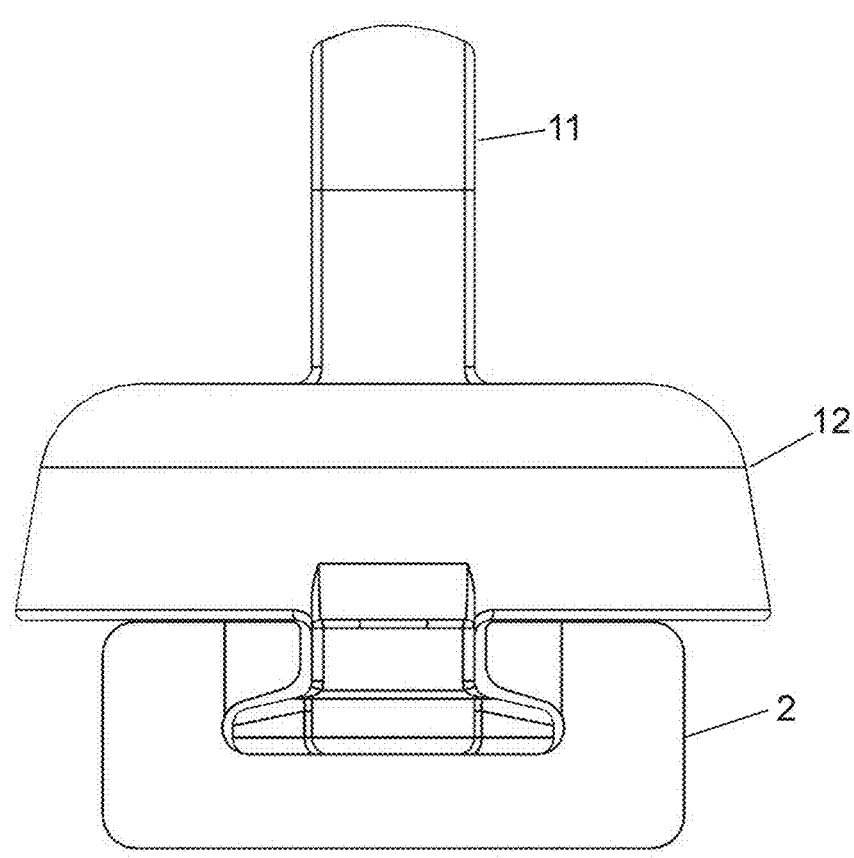
FIG. 10 is a front view of the system, in accordance with one or more embodiments of the present disclosure.
Figure 11:
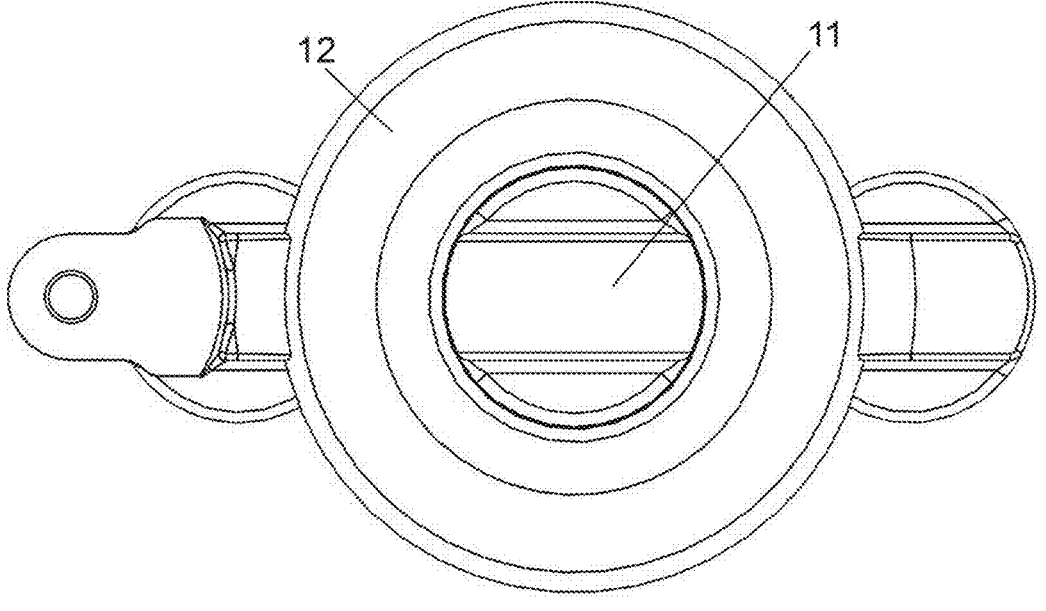
FIG. 11 is a top view of the system, in accordance with one or more embodiments of the present disclosure.
Figure 12:
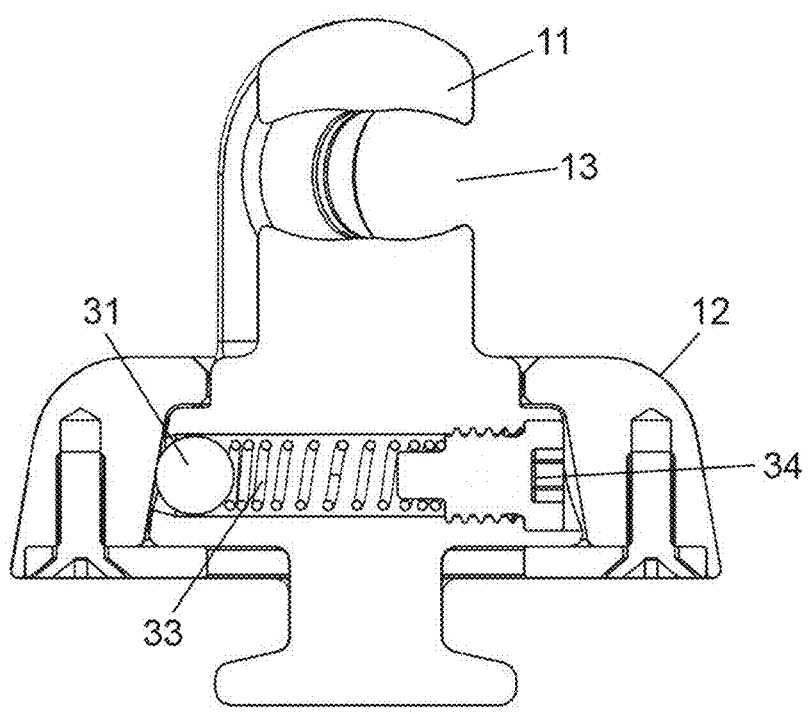
FIG. 12 is a sectional view of the system, in accordance with one or more embodiments of the present disclosure.
Figure 13:
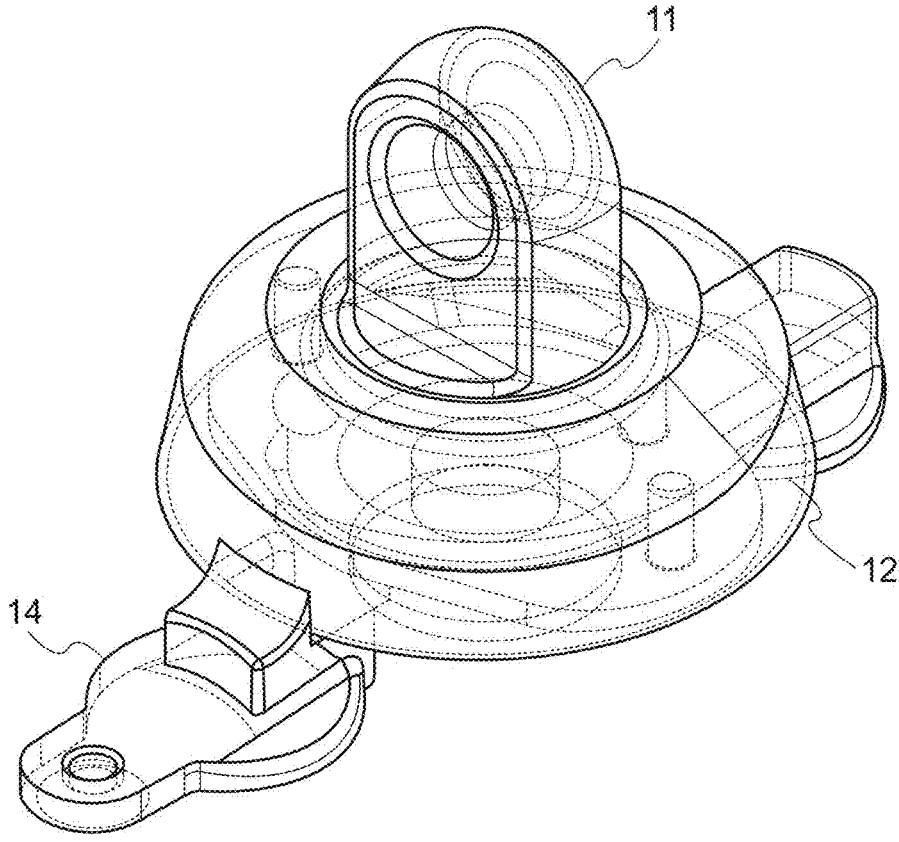
FIG. 13 is a transparent isometric view of the system, in accordance with one or more embodiments of the present disclosure.
Figure 14:
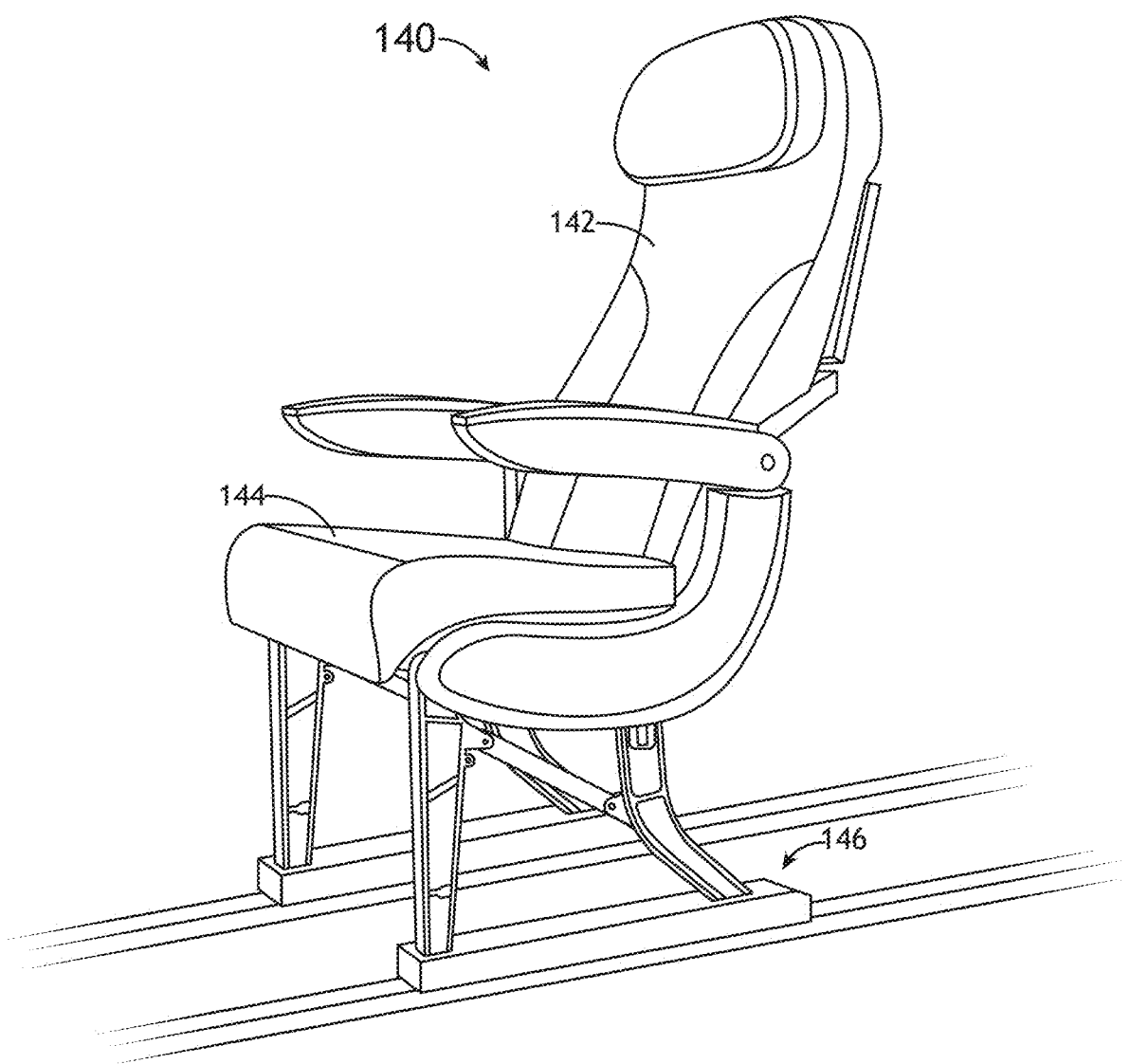
FIG. 14 is a schematic view of an aircraft seat including the system, in accordance with one or more embodiments of the present disclosure.

FIG. 8 shows, by arrows R, R', the direction of relative rotation between the first and the second portions 11, 12 of the system 1.

Figure 6:
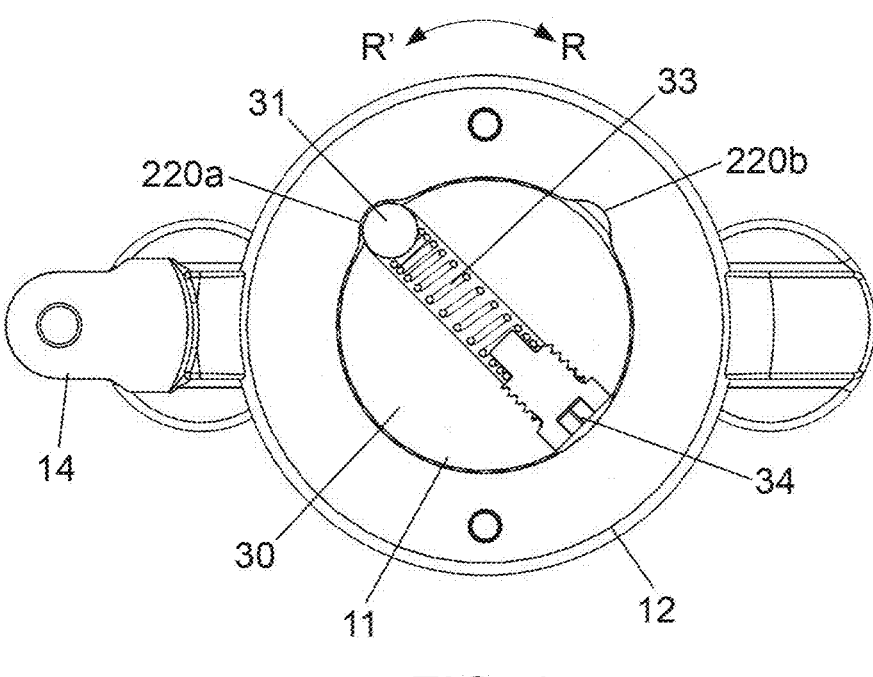
FIG. 6 shows an interior view of the system in a first position, in accordance with one or more embodiments of the present disclosure.
Figure 7:
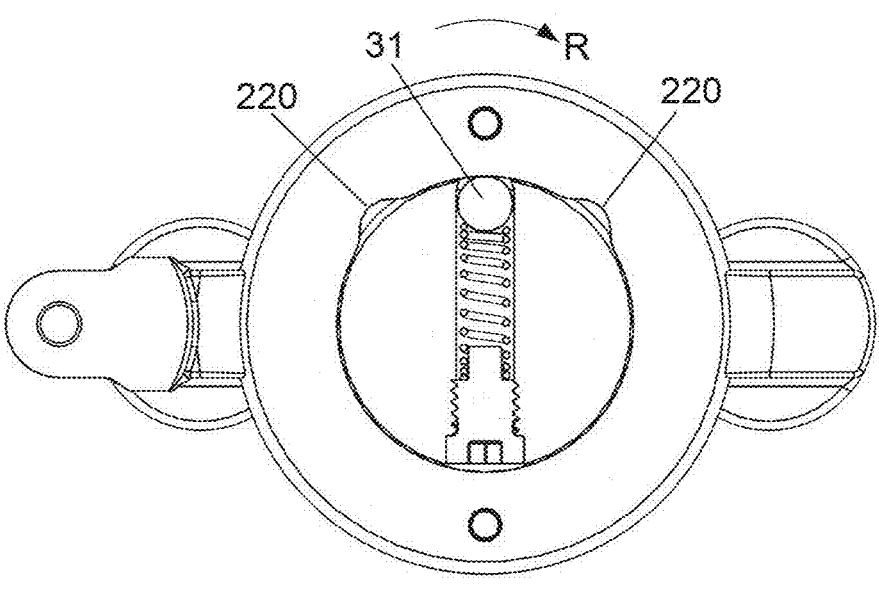
FIG. 7 shows an interior view of the system in a second position, in accordance with one or more embodiments of the present disclosure.

As the second portion 12 is rotated in direction R relative to the first portion 11 (or as the first portion 11 is rotated in direction R' relative to the second portion 12) from the middle position to the relative rotational position of the ball 31 and the recesses changes until the ball 31 is aligned with one recess 220a (here at the lateral position) shown in FIG. 6. Due to the force of the spring 33, as the ball 31 reaches the recess 220a, it is forced radially outwards into the recess and, therefore, locks relative rotation between the first and second portions 11, 12 to secure the first portion 11 in the lateral position (see FIG. 3). If the system 1 is rotated in the opposite direction, the ball 31 will reach the other recess 220b and will extend into and lock with that recess locking the first portion 11 into the longitudinal position shown in FIG. 8 and FIG. 4.

To move the system 1 out of the locked position and change the orientation, the spring 33 must be compressed to force the ball 31 out of the recess.

The resistance of the locking mechanism 30 may be adjustable, e.g., by appropriate selection of the spring stiffness and/or the force of the retainer 34.

Four views (e.g., front, top, cross-sectional, and isometric transparent) of a mounting system 1 according to the present disclosure are shown in FIGS. 10 to 13. The design of the system 1 can be very simple and can be formed with smooth rounded shapes making it easy to handle and clean. No additional external screws and nuts are needed. This avoids accumulation of debris common to such fasteners and also avoids the risk of the fitting being unscrewed accidentally or by unauthorised persons. Where the second portion 12 is a cylindrical or slightly conical housing and the first portion 11 is a rounded protruding flange, it is able to reliably and reproducibly carry uni-directional loads during dynamic events which improves the safety and reliability of the system 1. The system 1 is able to withstand loads in all directions, regardless of the mounting orientation.

Further, as mentioned above, the design of the system 1 is simple, with few components, such that no tools are required to change the mounting orientation.

The invention claimed is:

1. A mounting system tor mounting an object to a surface in two or more orientations relative to the surface, the mounting system comprising:
   a first portion configured to be attached to the object, in use;
   a second portion configured to be attached to the surface, in use, wherein the first portion and the second portion are rotatable relative to each other; and
   a locking mechanism configured to lock the first portion relative to the second portion when the first portion is at a predetermined rotational position relative to the second portion,
   wherein the locking mechanism comprises a spring loaded ball mounted to the first portion, biased towards the second portion and two or more recesses formed in the second portion arranged to receive the spring loaded ball when the spring loaded ball is rotationally aligned with a respective recess of the two or more recesses such that when the spring loaded ball is located in the respective recess, relative rotation between the first portion and the second portion is blocked.

2. The mounting system of claim 1, wherein the first portion is rotatably accommodated in the second portion.

3. The mounting system of claim 2, wherein the second portion defines a housing having an opening therethrough to receive the first portion.

4. The mounting system of claim 1, wherein the first portion comprises a means for attachment to the object, in use.

5. The mounting system of claim 4, wherein the means for attachment comprises a hole through the first portion.

6. The mounting system of claim 1, wherein the second portion comprises a means for attachment to the surface, in use.

7. The mounting system of claim 6, wherein the means for attachment comprises a rail formed integrally with and extending from the second portion.

8. The mounting system of claim 7, wherein the rail is provided with a hole for attachment with the surface, in use.

9. The mounting system of claim 1, wherein the locking mechanism is configured to lock in two or more distinct rotational positions.

10. The mounting system of claim 9, wherein the locking mechanism is configured to lock in two rotational positions of the two or more distinct rotational positions separated by substantially 90 degrees.

11. The mounting system of claim 1, wherein the first portion is configured to be attached to a vehicle seat and the second portion is configured to be attached to a track on a floor or a platform.

12. The mounting system of claim 11, wherein the second portion is configured to be fitted into a track groove of the track.

13. A vehicle seat system comprising:
   a seat;
   a floor track arranged in a given orientation of a floor or a platform of a vehicle; and
   a mounting system for mounting the seat to the floor or the platform in two or more orientations relative to a surface, wherein the mounting system comprises:
   a first portion configured to be attached to the seat, in use;
   a second portion configured to be attached to the track, in use, wherein the first portion and the second portion are rotatable relative to each other; and
   a locking mechanism configured to lock the first portion relative to the second portion when the first portion is at a predetermined rotational position relative to the second portion,
   wherein an orientation of the two or more orientations of the seat relative to the track is varied by relative rotation of the first portion and the second portion of the mounting system,
   wherein the locking mechanism comprises a spring loaded ball mounted to the first portion, biased towards the second portion and two or more recesses formed in the second portion arranged to receive the spring loaded ball when the spring loaded ball is rotationally aligned with a respective recess of the two or more recesses such that when the spring loaded ball is located in the respective recess, relative rotation between the first portion and the second portion is blocked.

14. The vehicle seat system of claim 13, wherein the seat comprises an aircraft seat.

* * * * *